No. 887,786. PATENTED MAY 19, 1908.
S. G. GAY.
SHAFT FOR VEHICLES.
APPLICATION FILED JAN. 11, 1907.

Witnesses:
O. W. Vermies
E. K. Lundy.

Inventor:
Simeon G. Gay.
By Frank D. Thomson
Atty.

ured and provided with transverse in-
UNITED STATES PATENT OFFICE.

SIMEON G. GAY, OF OTTAWA, ILLINOIS.

SHAFT FOR VEHICLES.

No. 887,786.     Specification of Letters Patent.     Patented May 19, 1908.

Application filed January 11, 1907. Serial No. 351,821.

*To all whom it may concern:*

Be it known that I, SIMEON G. GAY, a citizen of the United States, and a resident of Ottawa, in the county of Lasalle and State of Illinois, have invented certain new and useful Improvements in Shafts for Vehicles, of which the following is a clear, full, and exact description.

The object of my invention is to provide shafts for vehicles in which a comparatively light and economical metal construction is substituted for wood from one end to the other, and in which provision is made for the use of either wood or metal cross-bars for connecting the thills together, whereby a stronger and more durable shaft is obtained, and the constantly increasing cost, due to the use of wood in the construction of the same is avoided. This I accomplish by the means hereinafter fully described and as particularly pointed out in the claims.

Figure 3:
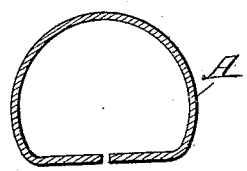
Figure 4:
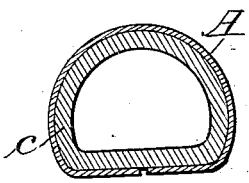
Figure 5:
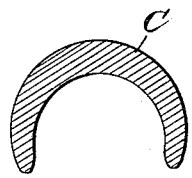
Figure 8:
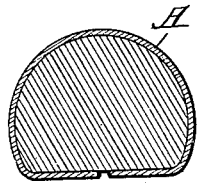
Figure 7:
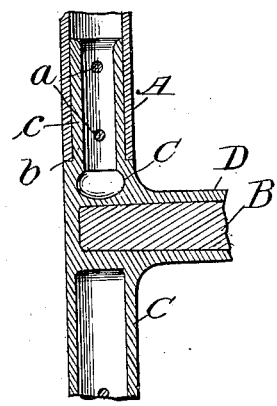
Figure 6:
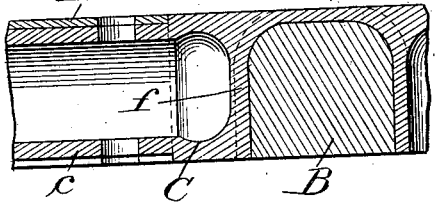
Figures 1, 2:
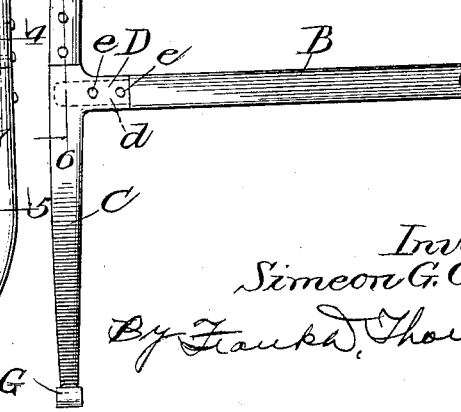

In the drawings:—Figure 1 is a side view of the shafts constructed in accordance with my invention. Fig. 2 is a plan view of one of the thills of said shafts and a portion of the cross-bar thereof. Fig. 3 is a cross section taken on dotted line 3, 3, Fig. 1. Fig. 4 is a cross section taken on dotted line 4—4, Fig. 1. Fig. 5 is a cross section taken on dotted line 5—5, Fig. 1. Fig. 6 is a longitudinal section through the joint of the forward sweep and of the rear portion of the thill, taken on dotted line 6—6, Fig. 2, and drawn to a larger scale. Fig. 7 is a longitudinal horizontal section through the joint of the forward sweep, and of the rear portion of the thill, drawn to a larger scale. Fig. 8 is a section similar to that shown in Fig. 3 of a modified construction of my invention.

In the drawings A represents the forward sweep of the thills of the shaft, extending from the forward end thereof to a point just in front of the cross-bar B, and it is made of pressed steel, and formed into the shape of a tube with the longitudinal edges thereof brought substantially together underneath the shaft, and, if desired, may be welded or otherwise connected together. These forward sweeps of the thills are, preferably, tapered from their rear to their forward ends, and are curved to conform to the customary shape of vehicle shafts now in use. The rear ends of these sweeps are fitted over the forwardly projecting extension *c* of the downwardly curved rear-end portion C, of the thills, and are secured thereto by bolts *a*, *a*, or otherwise. This extension *c* is, preferably, tubular and is reduced in cross section to fit into the rear end of the forward sweeps A, and to provide a shoulder *b* against which the rear end edges of said sweeps can abut. Just at the rear of said extensions, the said rear-end portion C is provided with transverse stubs D, which are of an inverted channel shape or tubular and provide sockets for the ends *d* of the cross-bar B, which are secured in said stub by means of bolts *e, e*, or otherwise. The cross-bar B is, preferably, made of wood, although if desired it may be made of tubular metal, and its ends entering stub D are reduced to provide a shoulder against which the end edges of the stub will abut.

As stated the forward extensions *c* of the rear portion C of the thills are, preferably, tubular, but to the rear of the transverse wall *f*, separating said extensions from, and constituting part of the side-wall of the socket of the stub D, the said rear-end portion, C, including the stub D, is, preferably, made of an inverted channel-shape. To the rear of the stub D, the rear-end portion C of the thills are, preferably, tapered, particularly the downwardly curved portion of the same, and terminate in an eye G.

I prefer to make the forward sweep A of the thills of pressed steel, and to make the rear end portion, C, thereof, including the stub D and the forward extension *c* thereof of malleable iron or steel. If desired, a filler of wood, substantially as shown in Fig. 8, may be inserted within the bore of and enveloped by the metal exterior of the sweep A, and, likewise within the channel of the rear end extension C. In this latter event the metal exterior may be made thinner and a lower grade of wood be used than is now possible, and the result be stronger and more economical than if made entirely of a superior quality of wood possessing the same degree of strength and durability.

What I claim as new is:—

1. Vehicle shafts comprising thills having the sweep thereof from the front end to about the transverse connecting-bar made of tubular metal, and malleable metal rear end portions of an inverted channel-shape having forward tubular extensions to which said sweeps are secured.

2. Vehicle shafts comprising thills having the rear end portions made of malleable metal shell and provided with transverse inverted channel-shaped stubs, and forward tubular extensions in front of said stubs, sweeps the rear ends of which are provided with sockets that fit over and are secured to said extensions, and a cross bar the ends of which are inserted in and secured to said stubs.

3. Vehicle shafts comprising thills having the rear end portions made of malleable metal shell and provided with transverse inverted channel-shaped stubs and forward tubular extensions in front of said stubs, tubular metal sweeps the rear ends of which are secured to said extensions, and a cross-bar the ends of which are inserted in and secured to said stubs.

4. Vehicle shafts comprising thills formed of separate front and rear portions, the latter being cast in one integral piece of channel-shaped metal and provided with a transversely projecting socket, and a longitudinally extended stub, and said front portion comprising thills the sweeps of which are formed of tubular metal and secured to the stubs of said rear portion.

5. Vehicle shafts comprising thills formed of separate front and rear portions, the latter being cast in one integral piece of channel-shaped metal and provided with a transversely projecting socket and a longitudinally extended stub, and said front portion comprising thills the sweeps of which are formed of tubular metal and secured to the stubs of said rear portion, and a cross-bar the ends of which are inserted in and secured to said transverse sockets.

In testimony whereof I have hereunto set my hand and seal this 21st day of December, A. D., 1906.

SIMEON G. GAY. [L. S.]

Witnesses:
 G. BARNARD,
 K. J. SCHMID.